United States Patent
Yumita et al.

(10) Patent No.: US 12,397,673 B2
(45) Date of Patent: Aug. 26, 2025

(54) SERVER, SYSTEM, AND MANAGEMENT METHOD

(71) Applicant: TOYOTA JIDOSHA KABUSHIKI KAISHA, Toyota (JP)

(72) Inventors: Osamu Yumita, Seto (JP); Yoichi Onishi, Okazaki (JP); Toru Ando, Obu (JP); Ikuma Suzuki, Okazaki (JP); Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/228,783

(22) Filed: Aug. 1, 2023

(65) Prior Publication Data
US 2024/0042889 A1 Feb. 8, 2024

(30) Foreign Application Priority Data
Aug. 5, 2022 (JP) ................. 2022-125614

(51) Int. Cl.
*B60L 53/67* (2019.01)
*B60L 53/66* (2019.01)

(52) U.S. Cl.
CPC ............... *B60L 53/67* (2019.02); *B60L 53/66* (2019.02)

(58) Field of Classification Search
CPC .......... G07F 15/005; H02J 7/00; G06Q 10/06; G06Q 30/0254; H01M 10/6554; H01M 8/04089; B60L 55/00; B60L 53/30; B60L 53/14; B60L 53/305; G08G 1/01
See application file for complete search history.

(56) References Cited

U.S. PATENT DOCUMENTS

| | | | |
|---|---|---|---|
| 12,046,780 B1 * | 7/2024 | Leighton | H01M 8/04089 |
| 2018/0154792 A1 * | 6/2018 | Wada | B60L 53/14 |
| 2020/0101850 A1 * | 4/2020 | Harty | B60L 55/00 |
| 2021/0380014 A1 * | 12/2021 | Hishida | H02J 7/00 |
| 2022/0289067 A1 * | 9/2022 | Adegbohun | H01M 10/6554 |
| 2023/0110777 A1 * | 4/2023 | Neligan | B60L 53/30 320/109 |
| 2024/0185150 A1 * | 6/2024 | Huang | G06Q 10/06 |

FOREIGN PATENT DOCUMENTS

| | | | | |
|---|---|---|---|---|
| CN | 103794045 A | * | 5/2014 | ............ G08G 1/01 |
| JP | 2018-093658 A | | 6/2018 | |
| KR | 20180071150 A | * | 6/2018 | ......... G06Q 30/0254 |
| WO | WO-2015185009 A1 | * | 12/2015 | ........... G08G 1/0967 |

* cited by examiner

*Primary Examiner* — Yuri Kan
(74) *Attorney, Agent, or Firm* — Dinsmore & Shohl LLP

(57) ABSTRACT

A server includes a communication unit (first acquisition unit) that acquires information about a status of use of an EVSE by a user (first user) who uses the EVSE (power control device) in a normal state. Further, the server includes a processor (controller) that performs, based on the information about the status of use, control for lending the EVSE to a user (second user) different from the foregoing user in a time period in which the foregoing user does not use the EVSE.

18 Claims, 7 Drawing Sheets

FIG.2

```
                                                                    ,-201
┌─────────────────────────────────────────────────────────────────────┐
│ LENDABLE STATION                                                    │
│                                                                     │
│    •EVSE20A                                                         │
│        LOCATION                    ××, ○○-KU, TOKYO                 │
│        SIZE OF VEHICLE BODY        NO RESTRICTION                   │
│        THAT CAN BE PARKED                                           │
│        SPECIFICATION OF EVSE       NORMAL CHARGING                  │
│        AVAILABLE TIME              AVAILABLE UNTIL 15 O'CLOCK       │
│                                                                     │
│                                                                     │
│    •EVSE20B                                                         │
│        LOCATION                    ◆◆, △△-KU, TOKYO                 │
│        SIZE OF VEHICLE BODY        ○○ mm OR LESS IN TOTAL LENGTH,   │
│        THAT CAN BE PARKED          ×× mm OR LESS IN VEHICLE WIDTH   │
│        SPECIFICATION OF EVSE       RAPID CHARGING                   │
│        AVAILABLE TIME              AVAILABLE UNTIL 20 O'CLOCK       │
│                                                                     │
│                                                                     │
│ NON-LENDABLE STATION                                                │
│                                                                     │
│    •EVSE20C                                                         │
│        LOCATION                    ▲▲, ■■-KU, TOKYO                 │
│        SIZE OF VEHICLE BODY        △△ mm OR LESS IN TOTAL LENGTH,   │
│        THAT CAN BE PARKED          ◆◆ mm OR LESS IN VEHICLE WIDTH   │
│        SPECIFICATION OF EVSE       NORMAL CHARGING                  │
│        AVAILABLE TIME              AVAILABLE FROM 17 O'CLOCK        │
│                                                                     │
└─────────────────────────────────────────────────────────────────────┘
```

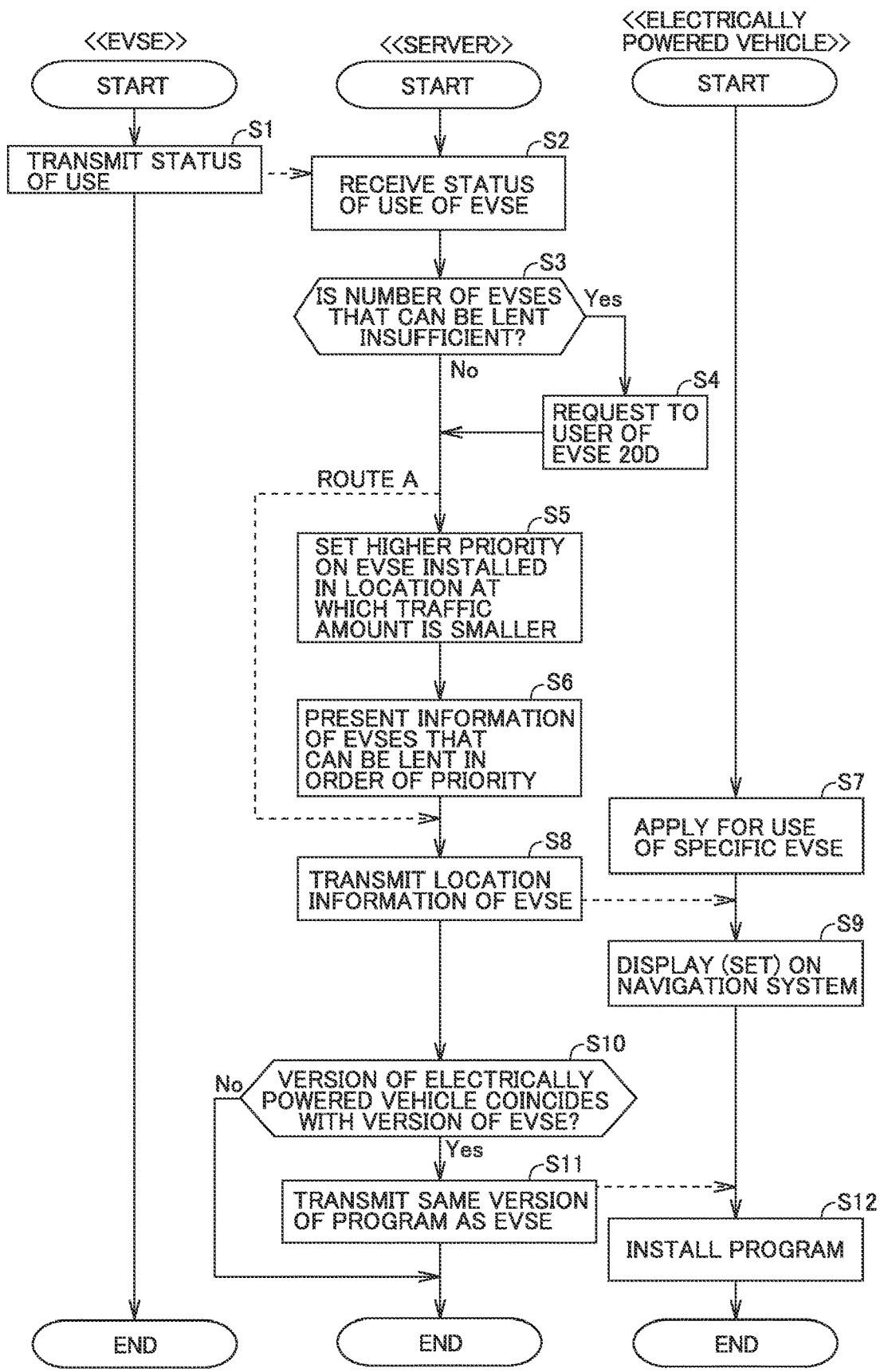

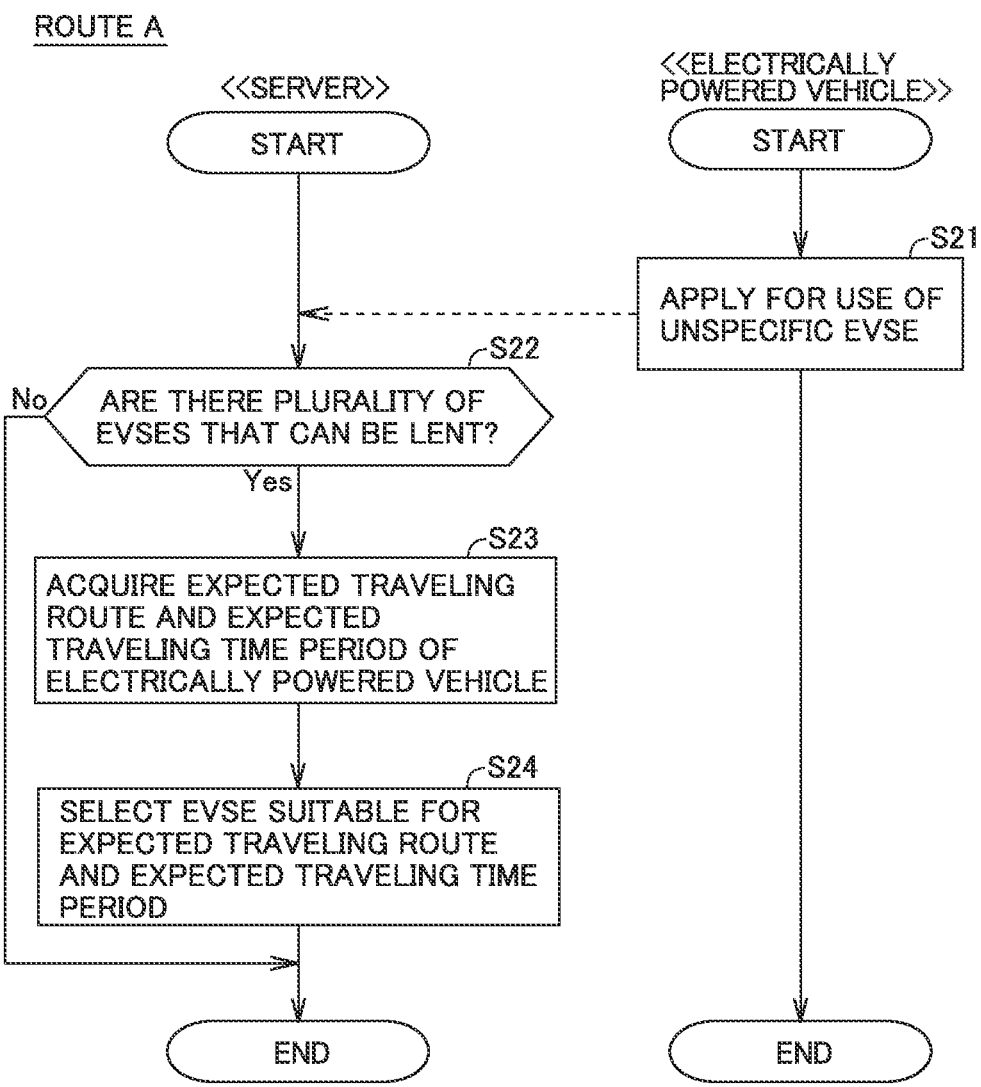

SERVER, SYSTEM, AND MANAGEMENT METHOD

CROSS REFERENCE TO RELATED APPLICATIONS

This nonprovisional application is based on Japanese Patent Application No. 2022-125614 filed on Aug. 5, 2022 with the Japan Patent Office, the entire contents of which are hereby incorporated by reference.

BACKGROUND

Field

The present disclosure relates to a server, a system, and a management method.

Description of the Background Art

Japanese Patent Laying-Open No. 2018-093658 discloses a charging device provided at a user's home. By connecting a vehicle to the charging device via a charging cable, the vehicle is charged. When the user goes out, the vehicle is charged by connecting the vehicle to a charging device at a location to which the user goes.

SUMMARY

In Japanese Patent Laying-Open No. 2018-093658, the charging device at home is not being used when the user goes out with the vehicle. Therefore, it has been desired to effectively utilize the charging device (power control device) that is not being used.

The present disclosure has been made to solve the above-described problem and has an object to provide a server, a system, and a management method so as to effectively utilize a power control device that is not being used.

A server according to a first aspect of the present disclosure is a server that manages at least one power control device capable of performing power control including at least one of power feeding from an electrically powered vehicle to a power system and charging from the power system to the electrically powered vehicle. The electrically powered vehicle is capable of performing the power control when the electrically powered vehicle is electrically connected to the power control device. The server includes: a first acquisition unit that acquires information about a status of use of the power control device by a first user who uses the power control device in a normal state; and a controller that performs, based on the information about the status of use, control for lending the power control device to a second user different from the first user in a time period in which the first user does not use the power control device.

In the server according to the first aspect of the present disclosure, as described above, the control for lending the power control device to the second user different from the first user is performed in the time period in which the first user does not use the power control device. Thus, in the time period in which the power control device is not used by the first user, the power control device can be used by the second user. As a result, the power control device that is not being used can be effectively utilized.

In some embodiments of the server according to the first aspect, the controller performs control of transmitting location information of the power control device to the second user. Thus, the second user can readily know the location of the power control device. As a result, the power control device that is not being used can be utilized more effectively.

In some embodiments, the controller performs the control of transmitting the location information of the power control device to the second user who has requested to use the power control device. Thus, the power control device that is not being used can be effectively utilized while satisfying the need of the second user who desires to use the power control device.

In some embodiments of the server according to the first aspect, the controller presents, on a bulletin board on the Internet, information of the power control device that is not being used by the first user. Thus, by using the Internet, the second user can readily acquire the information of the power control device that is not being used by the first user.

In some embodiments, the at least one power control device includes a plurality of power control devices. When each of the plurality of power control devices is not being used by the first user, the controller presents, on the bulletin board, information of each of the plurality of power control devices. With such a configuration, by using the Internet, the second user can readily acquire the information of each of the plurality of power control devices that are not being each used by the first user.

In some embodiments of the server that presents the information of each of the plurality of power control devices on the bulletin board, the controller controls a priority for each of the plurality of power control devices to be lent to the second user, by controlling an order of presentation of the plurality of power control devices on the bulletin board. With such a configuration, a power control device having a higher priority can be preferentially lent to the second user.

In some embodiments, the controller controls the order of presentation to present, at a higher rank on the bulletin board, a power control device included in the plurality of power control devices and installed at a location at which a traffic amount is smaller. With such a configuration, a frequency of use of the power control device installed at the location at which a traffic amount is smaller can be increased and a frequency of use of a power control device installed at a location at which a traffic amount is larger can be decreased. As a result, traffic congestion can be suppressed.

In some embodiments of the server that controls the priority in accordance with the order of presentation, the electrically powered vehicle performs the power control in accordance with a supply/demand adjustment request for power in each of a plurality of regions, and the controller controls the order of presentation to present, at a higher rank on the bulletin board, a power control device included in the plurality of power control devices and located in a region in which the supply/demand adjustment request is larger. With such a configuration, a frequency of performing the power control can be increased in a region in which the supply/demand adjustment request for power is large. As a result, the supply/demand adjustment request for power can be readily satisfied.

In some embodiments of the server that presents the information of each of the plurality of power control devices on the bulletin board, the plurality of power control devices include a first control device presented on the bulletin board when the first control device is not being used by the first user, and a second control device not presented on the bulletin board even when the second control device is not being used by the first user. When supply of the first control device is insufficient with respect to a demand for the plurality of power control devices, the controller performs control of requesting the first user, who uses the second control device in the normal state, to lend the second control device. With such a configuration, when the supply of the first control device is insufficient with respect to the demand for the power control devices, the second control device can be lent to the first user to whom the first control device cannot be lent.

In some embodiments of the server that presents the information of the power control device on the bulletin board on the Internet, the controller presents, on the bulletin board, information of a size of a vehicle body that is able to be parked in a parking area in which the power control device is installed. With such a configuration, the second user can readily select the power control device to be used, based on the information about the size of the vehicle body.

In some embodiments of the server according to the first aspect further includes a second acquisition unit that acquires information of each of an expected traveling route and an expected traveling time period of the electrically powered vehicle. The at least one power control device includes a plurality of power control devices. When each of the plurality of power control devices is not being used by the first user, the controller selects a power control device to be lent to the second user, based on at least one of the expected traveling route and the expected traveling time period. With such a configuration, an appropriate (optimal) power control device can be proposed to the second user based on at least one of the expected traveling route and the expected traveling time period of the second user. As a result, convenience for the second user can be increased.

In some embodiments of the server according to the first aspect, the controller performs control of requesting the first user of the power control device in a region in which a frequency of lending the power control device to the second user is higher than a predetermined criterion, to permit the power control device to be lent also in a midnight period. With such a configuration, in a region in which a frequency of lending the power control device is relatively high, a period of time during which the power control device can be lent can be made long.

A system according to a second aspect of the present disclosure includes: a power control device capable of performing power control including at least one of power feeding to a power system and charging from the power system; a server that manages the power control device; and an electrically powered vehicle capable of performing the power control when the electrically powered vehicle is electrically connected to the power control device. The server acquires information about a status of use of the power control device by a first user who uses the power control device in a normal state, and performs, based on the information about the status of use, control for lending the power control device to a second user different from the first user in a time period in which the first user does not use the power control device.

In the system according to the second aspect of the present disclosure, as described above, the control for lending the power control device to the second user different from the first user is performed in the time period in which the first user does not use the power control device. Thus, in the time period in which the power control device is not used by the first user, the power control device can be used by the second user. As a result, the system can be provided to effectively utilize the power control device that is not being used.

A management method according to a third aspect of the present disclosure is a management method using a server that manages a power control device capable of performing power control including at least one of power feeding from an electrically powered vehicle to a power system and charging from the power system to the electrically powered vehicle. The electrically powered vehicle is capable of performing the power control when the electrically powered vehicle is electrically connected to the power control device. The management method includes: acquiring information about a status of use of the power control device by a first user who uses the power control device in a normal state; and performing, based on the information about the status of use, control for lending the power control device to a second user different from the first user in a time period in which the first user does not use the power control device.

In the management method according to the third aspect of the present disclosure, as described above, the control for lending the power control device to the second user different from the first user is performed in the time period in which the first user does not use the power control device. Thus, in the time period in which the power control device is not used by the first user, the power control device can be used by the second user. As a result, the management method can be provided to effectively utilize the power control device that is not being used.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram showing a bulletin board on the Internet according to the first embodiment.

FIG. 3 is a first diagram showing a sequence in the system according to the first embodiment.

FIG. 4 is a second diagram showing a sequence (route A) in the system according to the first embodiment.

DESCRIPTION OF THE EMBODIMENTS

Figure 1:
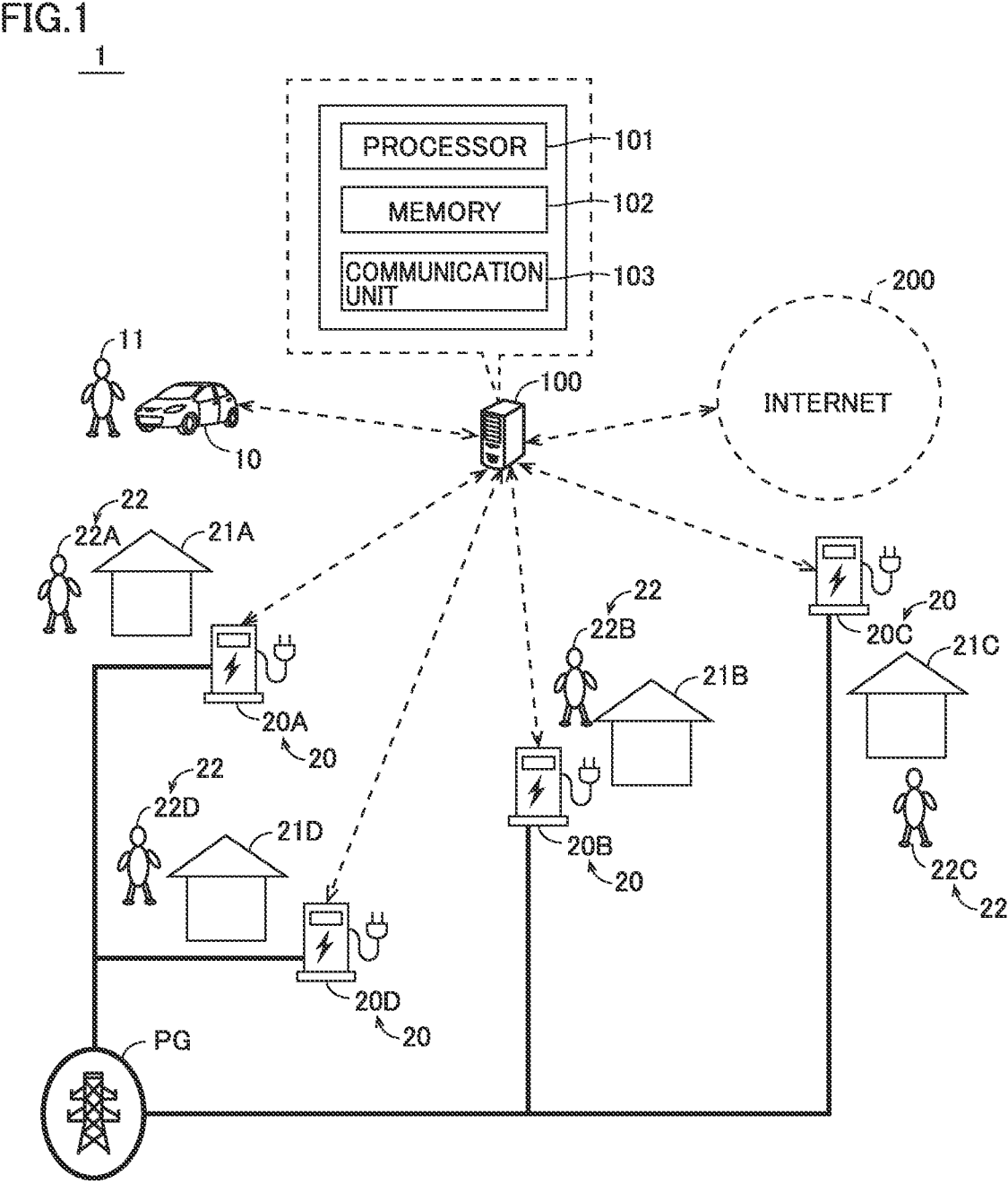
FIG. 1 is a diagram showing a configuration of a system according to a first embodiment.

Hereinafter, embodiments of the present disclosure will be described in detail with reference to figures. In the figures, the same or corresponding portions are denoted by the same reference characters and will not be described repeatedly.

First Embodiment

FIG. 1 is a diagram showing a configuration of a system 1 according to a first embodiment. System 1 includes a power system PG, a server 100, an electrically powered vehicle 10, and a plurality of EVSEs (Electric Vehicle Supply Equipment) 20. Server 100 manages the plurality of EVSEs 20. It should be noted that each of EVSEs 20 is an example of the "power control device" of the present disclosure.

EVSE 20 can feed power from electrically powered vehicle 10 to power system PG (external power feeding) and can charge power from power system PG to electrically powered vehicle 10 (external charging). Hereinafter, the external power feeding and the external charging may be collectively referred to as power control. Electrically powered vehicle 10 can perform the power control when electrically powered vehicle 10 is electrically connected to EVSE 20.

EVSEs 20 include an EVSE 20A, an EVSE 20B, an EVSE 20C, and an EVSE EVSE 20A, EVSE 20B, EVSE 20C, and EVSE 20D are provided at (provided beside) a house 21A, a house 21B, a house 21C, and a house 21D, respectively. It should be noted that each of EVSE 20A, EVSE 20B, and EVSE 20C is an example of the "first control device" of the present disclosure. EVSE 20D is an example of the "second control device" of the present disclosure.

It should be noted that each of EVSEs 20 is used by a user 22 in a normal state. Specifically, EVSE 20A, EVSE 20B, EVSE 20C, and EVSE 20D are respectively used by a user 22A, a user 22B, a user 22C, and a user 22D in the normal state. For example, users 22A to 22D are residents of houses 21A to 21D, respectively. It should be noted that the normal state means, for example, that user 22A stays in house 21A (that is, a vehicle of user 22A is parked at house 21A).

Examples of electrically powered vehicle 10 include a PHEV (Plug-in Hybrid Electric Vehicle), a BEV (Battery Electric Vehicle), and an FCEV (Fuel Cell Electric Vehicle). It should be noted that electrically powered vehicle 10 is used by a user 11. User 11 does not use EVSE 20 in the normal state.

Power system PG is a power grid constituted of a power plant and a power transmission/distribution facility (not shown). In the first embodiment, a power company serves as both a power generation entity and a power transmission/distribution entity. The power company corresponds to a general power transmission/distribution entity, and maintains and manages power system PG. The power company corresponds to an administrator of power system PG.

Further, server 100 is configured to manage: information of a registered electrically powered vehicle 10 (hereinafter also referred to as "vehicle information"); information of a registered user (hereinafter also referred to as "user information"), and information of a registered EVSE 20 (hereinafter also referred to as "EVSE information"). The user information, the vehicle information, and the EVSE information are distinguished by identification information (ID) and are stored in a memory 102 of server 100.

A user ID is identification information for identifying a user, and also functions as information (terminal ID) for identifying a mobile terminal (not shown) carried by the user. Server 100 is configured to store pieces of information received from mobile terminals in a distinguished manner for respective users ID. The user information includes a communication address of the mobile terminal carried by the user and a vehicle ID of electrically powered vehicle 10 belonging to the user.

The vehicle ID is identification information for identifying electrically powered vehicle 10. The vehicle ID may be a license plate or VIN (Vehicle Identification Number). The vehicle information includes a schedule of traveling of electrically powered vehicle 10.

An EVSE-ID is identification information for identifying EVSE 20. The EVSE information includes a communication address of EVSE 20 and a state of electrically powered vehicle 10 connected to EVSE 20. Further, the EVSE information includes information indicating a combination of electrically powered vehicle 10 and EVSE 20 connected to each other (for example, a combination of the EVSE-ID and the vehicle ID).

Server 100 includes a processor 101, memory 102, and a communication unit 103. It should be noted that processor 101 is an example of the "controller" of the present disclosure. Communication unit 103 is an example of each of the "first acquisition unit" and the "second acquisition unit" of the present disclosure.

Memory 102 stores: a program to be executed by processor 101; and information (for example, a map, a mathematical formula, and various types of parameters) to be used by the program. Communication unit 103 includes various types of communication I/Fs. Processor 101 controls communication unit 103.

Communication unit 103 can communicate with a DCM (Data Communication Module) (not shown) of electrically powered vehicle 10 and each of EVSEs 20A to 20D. Further, server 100 can use (access) Internet 200 through communication unit 103. Communication unit 103 acquires information of each of an expected traveling route and an expected traveling time period of electrically powered vehicle 10. It should be noted that communication unit 103 acquires each of the above-described pieces of information through communication from the DCM (not shown) of electrically powered vehicle 10 and a terminal (not shown) or the like possessed by user 11.

Communication unit 103 acquires information about a status of use of EVSE 20 by user 22 who uses EVSE 20 in the normal state. For example, communication unit 103 detects a use state (power state) of EVSE 20 to acquire the information about the status of use of EVSE 20. The status of use includes information about a use state at the present time and information about expected use in future.

Here, in a conventional system, an EVSE may not be effectively utilized due to presence of a time period in which the EVSE is not being used (not expected to be used).

In view of this, in the first embodiment, processor 101 performs, based on the information about the status of use of EVSE 20, control for lending EVSE 20 to user 11 different from user 22 in a time period in which user 22 does not use EVSE 20.

Specifically, as shown in FIG. 2, processor 101 presents, on a bulletin board 201 on Internet 200, information of EVSE 20 that is not being used by user 22. FIG. 2 shows an example in which each of EVSE 20A and EVSE 20B is not being used by user 22 (22A, 22B) and can be lent at the present time. Further, bulletin board 201 shown in FIG. 2 presents information of EVSE 20C that cannot be lent because it is currently being used by user 22C.

It should be noted that EVSE 20D is an EVSE that is not presented on bulletin board 201 even when EVSE 20D is not currently being used by user 22D. EVSE 20D is set not to be presented on bulletin board 201 (by contract or the like) even when EVSE 20D is not currently being used. It should be noted that there may be a plurality of EVSEs 20 (20D) not presented on bulletin board 201 even when they are not currently being used.

Various pieces of information about EVSEs 20 that can be lent are presented on bulletin board 201. Specifically, pieces of location information (addresses) of EVSEs 20 that can be lent are presented on bulletin board 201.

Further, bulletin board 201 presents information about the size of a vehicle body that can be parked in a parking area in which EVSE 20 that can be lent is installed. Bulletin board 201 shown in FIG. 2 indicates that there is no restriction on the size of the vehicle body that can be parked in the parking area in which EVSE 20A is installed. On the other hand, bulletin board 201 shown in FIG. 2 presents that there is a restriction on the size (total length and vehicle width) of the vehicle body in the parking area in which EVSE 20B is installed.

Further, bulletin board 201 presents information about specifications (a specification regarding charging/discharging, a specification regarding communication, and the like) of EVSE 20 that can be lent. Bulletin board 201 shown in FIG. 2 presents that EVSEs 20A and 20B correspond to normal charging and rapid charging, respectively.

Further, bulletin board 201 presents information about an available time of EVSE 20 that can be lent. Bulletin board 201 shown in FIG. 2 presents that EVSE 20A can be used in a period from the present time to 15 o'clock and EVSE 20B can be used in a period from the present time to 20 o'clock.

Further, bulletin board 201 presents information about EVSE 20 (20C) that cannot be lent. Bulletin board 201 shown in FIG. 2 presents the location of EVSE 20C the size of the vehicle body that can be parked, and the information about the specifications. Further, bulletin board 201 presents information about a time when EVSE 20C, which cannot be currently lent, becomes available. Specifically, bulletin board 201 shown in FIG. 2 presents that EVSE 20C will become available from 17 o'clock.

Further, processor 101 controls an order of presentation of the plurality of EVSEs 20 on bulletin board 201. Specifically, when there are a plurality of EVSEs 20 that can be lent, processor 101 controls the order of presentation of the plurality of EVSEs 20 that can be lent. It should be noted that when there are a plurality of EVSEs 20 that cannot be lent, processor 101 may control an order of presentation of EVSEs 20 that cannot be lent.

Specifically, processor 101 controls the order of presentation to present, at a higher rank on bulletin board 201, an EVSE 20 included in the plurality of EVSEs 20 (that can be lent) and installed at a location at which a traffic amount is smaller (for example, a location away from a principal road). On bulletin board 201 shown in FIG. 2, EVSE 20A is presented at a higher rank than EVSE 20B because a traffic amount at the location at which EVSE 20A is installed is smaller than a traffic amount at the location at which EVSE 20B is installed. With this, EVSE 20A is promoted to be lent as compared with EVSE 20B. Thus, processor 101 can control a priority for each of the plurality of EVSEs 20 to be lent to user 11.

Here, memory 102 (see FIG. 1) stores information about a magnitude of a traffic amount at the location at which each of EVSEs 20 is installed. Processor 101 controls the order of presentation of EVSEs 20 based on the information about the magnitude of the traffic amount stored in memory 102. It should be noted that server 100 may acquire, in real time (or whenever a predetermined time elapses) through communication unit 103, the information of the traffic amount at the location at which each EVSE 20 is installed.

Further, on bulletin board 201, user 11 performs an operation of selecting any one of EVSEs 20 that can be lent and that are presented on bulletin board 201, thereby permitting user 11 to lend EVSE 20. It should be noted that in addition to use from the present time, use from a predetermined time in future can be reserved. Further, user 11 of electrically powered vehicle 10 can desire (apply) random lending of EVSE 20 without specifying a type of EVSE 20.

(Management Method)

Figure 5:
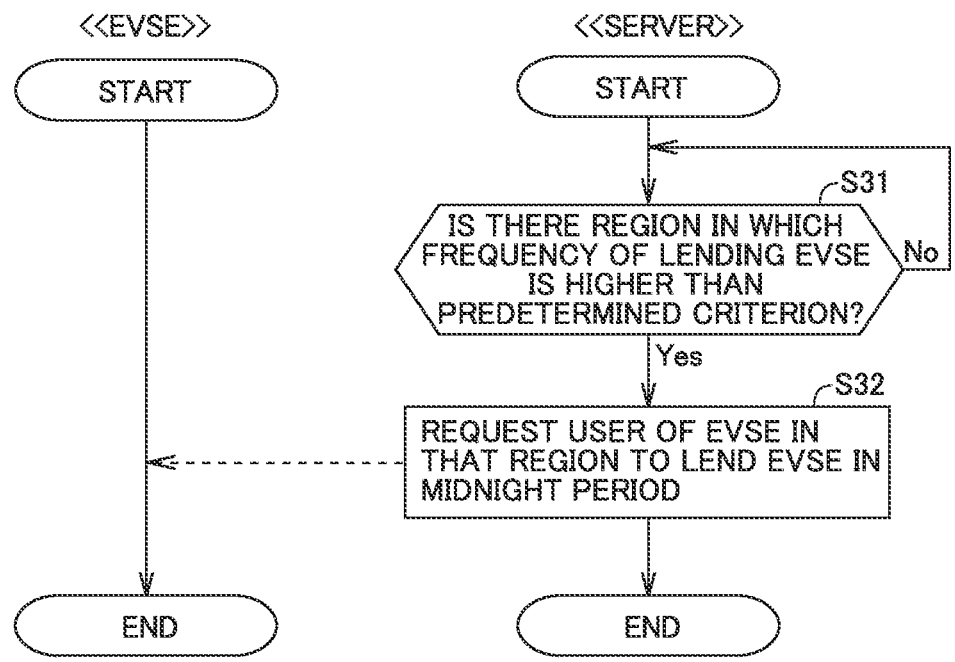
FIG. 5 is a third diagram showing a sequence in the system according to the first embodiment.

Next, a management method using server 100 will be described with reference to sequence diagrams of FIGS. 3 to 5. It should be noted that in the sequence shown in each of FIGS. 3 to 5, it is assumed that there is at least one EVSE 20 that can be lent.

First, in a step S1, each of the plurality of EVSEs 20 transmits the information about its status of use to server 100 (communication unit 103). Next, in a step S2, server 100 (communication unit 103) receives the information about the status of use transmitted from EVSE 20 in step S1.

In a step S3, server 100 (processor 101) determines whether or not the number of EVSEs 20 that can be lent is insufficient, based on the information acquired in step S2. When it is determined that the number of EVSEs 20 that can be lent is insufficient (Yes in S3), the process proceeds to a step S4. When it is determined that the number of EVSEs 20 that can be lent is sufficient (No in S3), the process proceeds to a step S5. It should be noted that the expression "the number of EVSEs 20 is insufficient" means that the number of EVSEs 20 that can be lent among EVSEs 20A to 20C is insufficient with respect to a demand for EVSEs 20.

A method of determination in step S3 will be specifically described. For example, when there is no EVSE 20 that can be lent, server 100 (processor 101) determines that the number of EVSEs 20 that can be lent is insufficient. Further, when processor 101, which is configured to detect the number of users 11 who are browsing bulletin board 201, detects that the number of detected users 11 is more than the number of EVSEs 20 that can be lent, it may be determined that the number of EVSEs 20 that can be lent is insufficient. It should be noted that when the number of users 11 who are viewing bulletin board 201 is equal to or more than a predetermined number, it may be determined that the number of EVSEs 20 is insufficient. Further, when the number of users who desire to lend unspecific EVSEs 20 (who allow server 100 to randomly select EVSEs 20 to be lent) is more than the number of EVSEs 20 that can be lent, it may be determined that the number of EVSEs 20 is insufficient.

In a step S4, processor 101 performs control of requesting user 22D who uses EVSE 20D in the normal state to lend (open up) EVSE 20D. When the request is accepted by user 22D, the information of EVSE 20D is presented on bulletin board 201. After step S4, the process proceeds to a step S5. It should be noted that when there are a plurality of users 22D (EVSEs 20D), a request for lending is made to a user 22D different from the previous user in step S4 performed for the second or subsequent time.

In step S5, processor 101 sets a higher priority on an EVSE 20 included in EVSEs 20 that can be lent and installed at a location at which a traffic amount is smaller. Next, in a step S6, processor 101 controls the order of presentation (see FIG. 2) to present, at a higher rank on bulletin board 201, EVSE 20 having the higher priority set in step S5.

In a step S7, it is assumed that user 11 of electrically powered vehicle 10 has applied for use of a specific EVSE 20. In the description below, it is assumed that user 11 has applied for use of EVSE 20A.

In a step S8, processor 101 transmits, to electrically powered vehicle 10 (or the terminal of user 11) through communication unit 103, detailed location information of EVSE 20A for which the application for use has been made in step S7.

Figure 6:
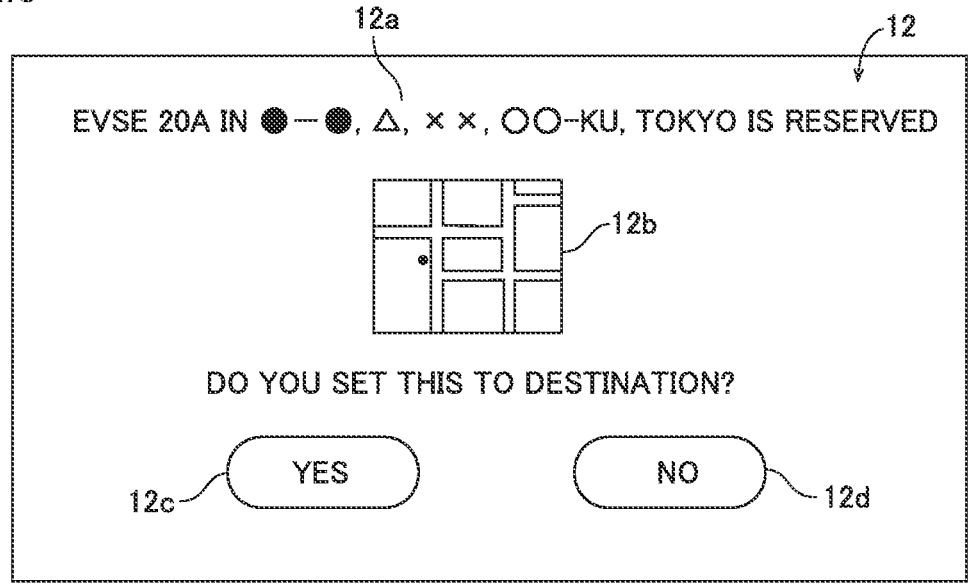
FIG. 6 is a diagram showing display of a navigation system of an electrically powered vehicle according to the first embodiment.

In a step S9, the location information transmitted in step S8 is displayed on a navigation system 12 (see FIG. 6) of electrically powered vehicle 10. The location information displayed on navigation system 12 includes more detailed information than the location information (see FIG. 2) displayed on the bulletin board. For example, navigation system 12 displays address information 12a of the location at which EVSE 20 is installed. Further, a map 12b is displayed on navigation system 12 to indicate the location at which EVSE 20 is installed.

Further, navigation system 12 displays a message for confirming whether to set, to a destination, a location that is based on the displayed location information. When a button 12c representing "YES" is selected, the location that is based on the location information is set to the destination. When a button 12d representing "NO" is selected, it is not set to the destination. It should be noted that the location that is based on the location information may be automatically set to the destination without performing the above confirmation.

In a step S10, processor 101 determines whether or not the version of a power control program of electrically powered vehicle 10 coincides with the version of a power control program of EVSE 20A (whether or not there is connection compatibility). Here, the program of EVSE 20 is basically the latest version. Hence, in step S10, processor 101 determines whether or not the version of the power control program of electrically powered vehicle 10 is older than the version of the power control program of EVSE 20A. When the versions are different from each other (Yes in S10), the process proceeds to a step S11. When the versions coincide with each other (No in S10), the process of server 100 is ended.

In step S11, processor 101 transmits the same version of the program as the version of the power control program of EVSE 20A to electrically powered vehicle 10 through communication unit 103. In a step S12, the program transmitted in step S11 is installed into electrically powered vehicle 10. As a result, the power control program of electrically powered vehicle 10 is updated.

Next, referring to FIG. 4, the following describes a sequence of a route A branching after step S4 in FIG. 3.

First, in a step S21, it is assumed that user 11 of electrically powered vehicle 10 has applied for use (lending) of an EVSE 20 without specifying EVSE 20. In other words, user 11 desires random selection of an EVSE 20 to be lent.

Next, in a step S22, server 100 (processor 101) determines whether or not there are a plurality of EVSEs 20 that can be lent. When there are a plurality of EVSEs 20 that can be lent (Yes in S22), the process proceeds to a step S23. When there are not a plurality of EVSEs 20 that can be lent (i.e., when there is only one EVSE 20 that can be lent) (No in S22), the process of route A is ended.

Next, in step S23, server 100 (processor 101) acquires information about an expected traveling route and an expected traveling time period of electrically powered vehicle 10 (having applied for use of unspecific EVSE 20) through communication unit 103. It should be noted that the process of step S23 may be completed before this timing.

Next, in a step S24, server 100 (processor 101) selects an EVSE 20 suitable for the expected traveling route and expected traveling time period acquired in step S23. Specifically, an EVSE 20 provided along the expected traveling route, an EVSE 20 that can be lent in the expected traveling time period, or the like is selected. On this occasion, a plurality of EVSEs 20 may be selected. Then, the process proceeds to step S8 (see FIG. 3).

Next, a sequence showing another control by server 100 will be described with reference to FIG. 5. It should be noted that the control shown in FIG. 5 may be performed at any timing.

First, in a step S31, server 100 (processor 101) determines whether or not there is a region in which a frequency of lending EVSE 20 is higher than a predetermined criterion. For example, when there is a region in which EVSE 20 is lent a predetermined number of times (for example, ten times) or more in a recent predetermined period (for example, one week), processor 101 determines that the region is a region in which the frequency is higher than the predetermined criterion. When it is determined that there is a region in which the frequency is higher than the predetermined criterion (Yes in S31), the process proceeds to a step S32. When it is determined that there is no region in which the frequency is higher than the predetermined criterion (No in S31), the process of step S31 is repeated.

Next, in step S32, processor 101 performs control of requesting user 22 of EVSE 20 in the region in which the frequency of lending EVSE 20 is determined to be higher than the predetermined criterion in step S31, to lend EVSE 20 also in a midnight period. It should be noted that the request may be made to user 22 of EVSE 20 for which the frequency of lending is determined to be higher than the predetermined criterion without taking the frequency of lending in each region into consideration.

As described above, in the first embodiment, processor 101 performs control for lending EVSE 20 to user 11 in a time period in which user 22 does not use EVSE 20. Thus, it is possible to suppress presence of a period of time during which EVSE 20 is not being used. As a result, EVSE 20 can be effectively utilized.

Further, in the first embodiment, processor 101 performs the control of transmitting the location information of EVSE 20 to user 11. Thus, user 11 can readily use EVSE 20, with the result that EVSE 20 can be utilized more effectively.

Second Embodiment

Next, a second embodiment of the present disclosure will be described with reference to FIGS. 7 and 8. In the second embodiment, unlike the first embodiment in which the priority on each of EVSEs 20 to be lent is determined based on the magnitude of the traffic amount, the priority is determined based on a magnitude of a supply/demand adjustment request for power. It should be noted that the same configurations as those in the first embodiment are denoted by the same reference characters and will not be described repeatedly.

Figure 7:
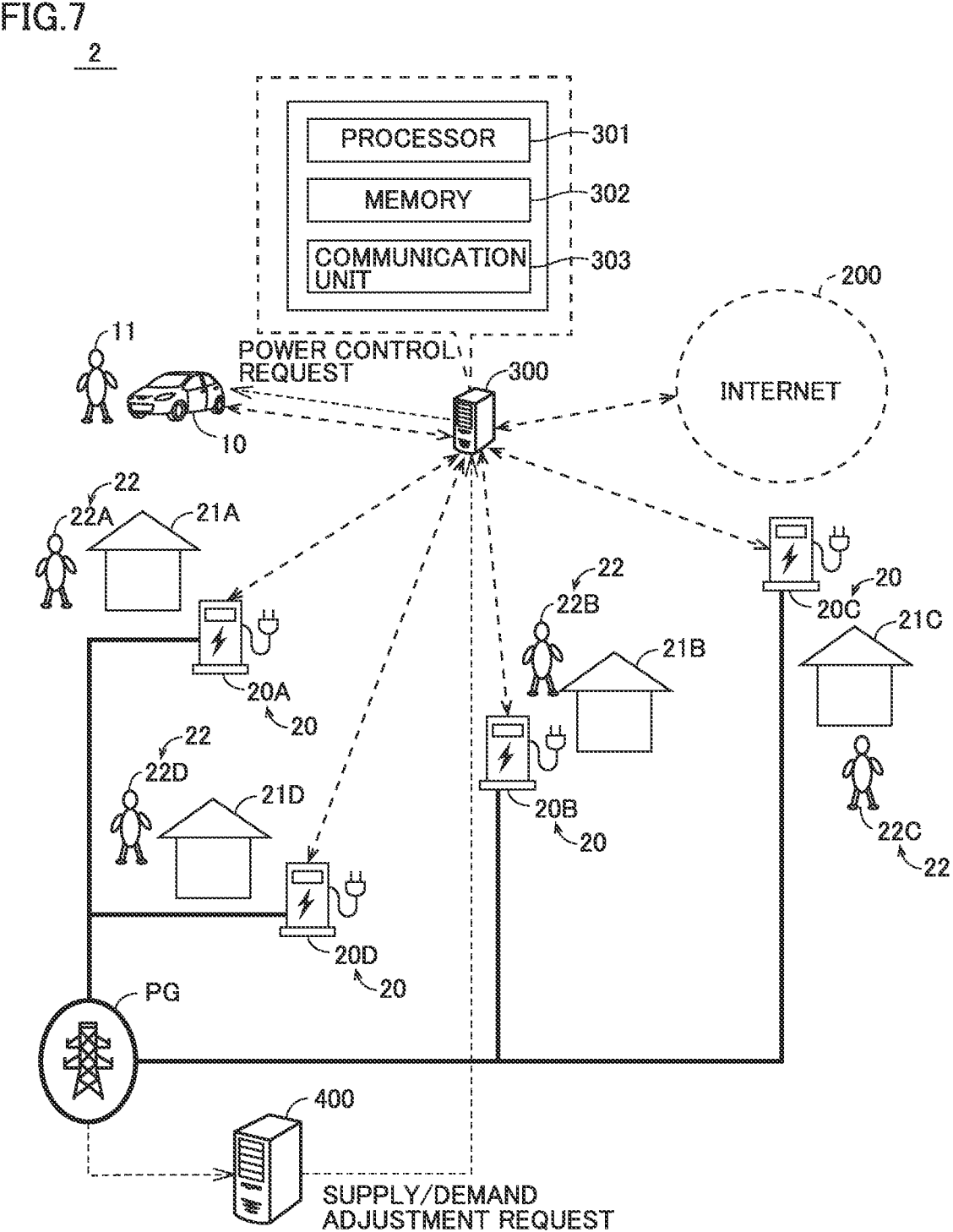
FIG. 7 is a diagram showing a configuration of a system according to a second embodiment.
Figure 8:
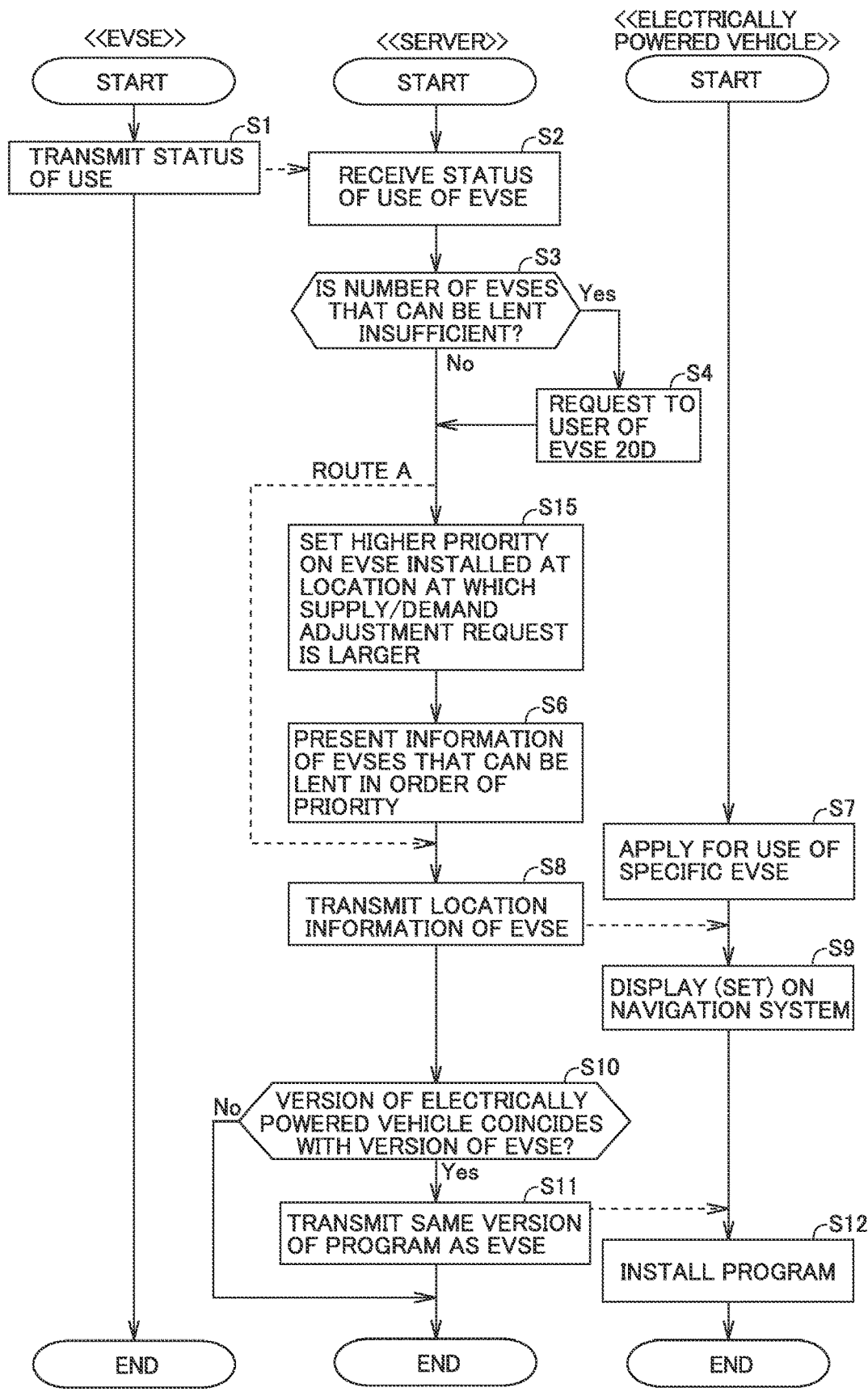
FIG. 8 is a diagram showing a sequence in the system according to the second embodiment.

FIG. 7 is a diagram showing a configuration of a system 2 according to a second embodiment. System 2 includes a power system PG, a server 300, an electrically powered vehicle 10, a plurality of EVSEs 20, and a system management server 400. It should be noted that in the second embodiment, it is assumed that the plurality of EVSEs 20 are provided in different regions.

System management server 400 manages supply/demand of power system PG (power grid). System management server 400 belongs to a power company. Based on generation and consumption of power by each power adjustment resource managed by system management server 400, system management server 400 transmits, to server 300, a request (supply/demand adjustment request) for adjusting a power demand amount of power system PG. Specifically, when power to be generated by the power adjustment resource is expected to be larger (or when power generated by the power adjustment resource is currently larger) than that in the normal state, system management server 400 transmits, to server 300, a request for increasing the power demand amount to be larger than that in the normal state.

Further, when power to be consumed by the power adjustment resource is expected to be larger (or when power consumed by the power adjustment resource is currently larger) than that in the normal state, system management server 400 transmits, to server 300, a request for decreasing the power demand amount to be smaller than that in the normal state.

Server 300 is a server managed by the aggregator. The aggregator is an electricity business entity that aggregates a plurality of power adjustment resources in regions and predetermined facilities to provide an energy management service.

Server 300 requests electrically powered vehicle 10 to perform power control as one means for increasing or decreasing the power demand amount of power system PG. Server 300 transmits, to electrically powered vehicle 10 or a mobile terminal (not shown) possessed by the user of electrically powered vehicle 10, a request signal for making the above-described request to electrically powered vehicle 10. Electrically powered vehicle 10 performs the power control in accordance with a supply/demand adjustment request for power in each of a plurality of regions.

Server 300 includes a processor 301, a memory 302, and a communication unit 303. It should be noted that processor 301 is an example of the "controller" of the present disclosure. Communication unit 303 is an example of each of the "first acquisition unit" and the "second acquisition unit" of the present disclosure.

(Management Method)

Next, a management method using server 300 will be described with reference to a sequence diagram of FIG. 8. In the sequence diagram of FIG. 8, a process of step S15 is performed instead of the process of step S5 in the sequence diagram of the first embodiment (see FIG. 3). It should be noted that processes other than step S15 are the same as those in the first embodiment.

In step S15, server 300 (processor 301) controls the order of presentation so as to present, at a higher rank on bulletin board 201, an EVSE 20 included in the plurality of EVSEs 20 and installed in a region in which the supply/demand adjustment request for power is larger. Whenever a predetermined time elapses, server 300 acquires, through communication unit 303, information (such as the magnitude of the request) about the supply/demand adjustment request in the region in which each EVSE 20 is provided. Then, processor 301 controls the order of presentation of EVSEs 20 on bulletin board 201 based on the acquired information about the supply/demand adjustment request.

It should be noted that configurations and controls other than those described above are the same as those in the first embodiment, and therefore will not be described repeatedly.

As described above, in the second embodiment, processor 301 controls the order of presentation to present, at a higher rank on bulletin board 201, an EVSE 20 included in the plurality of EVSEs 20 and located in the region in which the supply/demand adjustment request for power is larger. Thus, the power control can be more promoted in the region in which the supply/demand adjustment request for power is large.

In each of the above-described first and second embodiments, it has been illustratively indicated that when an application has been made to use a specific EVSE location information of EVSE 20 is transmitted to user 11 having made the application; however, the present disclosure is not limited thereto. For example, the location information may be presented on bulletin board 201 of Internet 200. In this case, control may be performed such that only the user having made the application can view the location information.

In each of the first and second embodiments, it has been illustratively indicated that information of EVSE 20 that is not being used by user 22 is presented on bulletin board 201; however, the present disclosure is not limited thereto. For example, information of EVSE 20 that is not being used by user 22 may be transmitted to user 11 of electrically powered vehicle 10 without presenting it on bulletin board 201.

In each of the first and second embodiments, it has been illustratively indicated that the program is transmitted to electrically powered vehicle 10 to update the program of electrically powered vehicle 10; however, the present disclosure is not limited thereto. A program may be sent to EVSE 20 to update the program of EVSE 20.

In each of the above-described first and second embodiments, it has been illustratively indicated that EVSE 20 having a high priority is presented at a higher rank on bulletin board 201; however, the present disclosure is not limited thereto. For example, information of EVSE 20 having a higher priority may be displayed in a larger size on bulletin board 201.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server comprising:
a processor that:
acquires information about a status of use of a power control device by a first user who uses the power control device in a normal state,
performs, based on the information about the status of use, control for lending the power control device to a second user different from the first user in a time period in which the first user does not use the power control device,
controls the power control device that is configured to perform power control including feeding power from an electrically powered vehicle to a power system or charging power from the power system to the electrically powered vehicle, the electrically powered vehicle being electrically connected to the processor, and
acquires, in response to lapse of a predetermined time, information in real-time of a traffic amount at a location at which the power control device is installed.

2. The server according to claim 1, wherein the processor performs control of transmitting location information of the power control device to the second user.

3. The server according to claim 2, wherein the processor performs the control of transmitting the location information of the power control device to the second user who has requested to use the power control device.

4. The server according to claim 1, wherein the processor presents, on a bulletin board on the Internet, information of the power control device that is not being used by the first user.

5. The server according to claim 4, wherein
the power control device includes a plurality of power control devices, and
when each of the plurality of power control devices is not being used by the first user, the processor presents, on the bulletin board, information of each of the plurality of power control devices.

6. The server according to claim 5, wherein the processor controls a priority for each of the plurality of power control devices to be lent to the second user, by controlling the order of presentation of the plurality of power control devices on the bulletin board.

7. The server according to claim 6, wherein the processor controls the order of presentation to present, at a different rank on the bulletin board, the power control device included in the plurality of power control devices and installed at a location at which the traffic amount is smaller.

8. The server according to claim 6, wherein
the electrically powered vehicle performs the power control in accordance with a supply/demand adjustment request for the power in each of a plurality of regions, and
the processor controls the order of presentation to present, at a different rank on the bulletin board, the power control device included in the plurality of power control devices and located in a region in which the supply/demand adjustment request is larger.

9. The server according to claim 5, wherein
the plurality of power control devices include a first control device presented on the bulletin board when the first control device is not being used by the first user, and a second control device not presented on the bulletin board even when the second control device is not being used by the first user, and
when supply of the first control device is lower than a demand for the plurality of power control devices, the processor performs control of requesting the first user, who uses the second control device in the normal state, to lend the second control device.

10. The server according to claim 4, wherein the processor presents, on the bulletin board, information of a size of a vehicle body that is able to be parked in a parking area in which the power control device is installed.

11. The server according to claim 1, wherein the processor acquires information of each of an expected traveling route and an expected traveling time period of the electrically powered vehicle, wherein
the power control device includes a plurality of power control devices, and
when each of the plurality of power control devices is not being used by the first user, the processor selects the power control device to be lent to the second user, based on at least one of the expected traveling route and the expected traveling time period.

12. The server according to claim 1, wherein the processor performs control of requesting the first user of the power control device in a region in which a frequency of lending the power control device to the second user is higher than a predetermined criterion, to permit the power control device to be lent also in a midnight period.

13. A system comprising:
a power control device that is configured to perform power control including feeding power to a power system and charging power from the power system;
a server that controls the power control device; and
an electrically powered vehicle that is configured to perform the power control in response to the electrically powered vehicle being electrically connected to the power control device, wherein
the server:
acquires information about a status of use of the power control device by a first user who uses the power control device in a normal state,
performs, based on the information about the status of use, control for lending the power control device to a second user different from the first user in a time period in which the first user does not use the power control device, and
acquires, in response to lapse of a predetermined time, information in real-time of a traffic amount at a location at which the power control device is installed.

14. A method, the method comprising:
acquiring information about a status of use of the power control device by a first user who uses the power control device in a normal state;
performing, based on the information about the status of use, control for lending the power control device to a second user different from the first user in a time period in which the first user does not use the power control device;
controlling the power control device that is configured to perform power control including feeding power from an electrically powered vehicle to a power system or charging power from the power system to the electrically powered vehicle, the electrically powered vehicle being electrically connected to the power control device; and
acquiring, in response to lapse of a predetermined time, information in real-time of a traffic amount at a location at which the power control device is installed.

15. The method according to claim 14, further comprising:
determining whether a version of a power control program of the electrically powered vehicle coincides with a version of a power control program of the power control device, the determination relating to whether or not there is a connection compatibility between the electrically powered vehicle and the power control device;
transmitting the same version of the program as the version of the power control program of the power control device to the electrically powered vehicle in response to determining that the versions are different from each other; and
updating the power control program of the electrically powered vehicle in accordance with the transmitted version of the power control program.

16. The server according to claim 1, wherein the processor displays an order of presentation of the power control device in accordance with the acquired information in real-time of the traffic amount.

17. The system according to claim 13, wherein the server displays an order of presentation of the power control device in accordance with the acquired information in real-time of the traffic amount.

18. The method according to claim 14 further comprising displaying an order of presentation of the power control device in accordance with the acquired information in real-time of the traffic amount.

* * * * *